United States Patent [19]

Israel

[11] Patent Number: 5,683,734
[45] Date of Patent: Nov. 4, 1997

[54] ROTARY FILM COOKIE MOLDING

[75] Inventor: Gary Israel, West Nyack, N.Y.

[73] Assignee: Pepperidge Farm, Incorporated, Norwalk, Conn.

[21] Appl. No.: 468,797

[22] Filed: Jun. 6, 1995

[51] Int. Cl.[6] .................................................. A21D 6/00
[52] U.S. Cl. ........................ 426/496; 426/389; 426/512
[58] Field of Search ...................................... 426/496, 502, 426/503, 512, 389; 425/89

[56] References Cited

U.S. PATENT DOCUMENTS

| | | | |
|---|---|---|---|
| 2,700,939 | 2/1955 | Liston | 425/89 |
| 3,050,017 | 8/1962 | Mähler | 426/275 |
| 3,410,699 | 11/1968 | Peters | 426/512 |
| 4,076,207 | 2/1978 | Austin | 249/66.1 |
| 4,578,273 | 3/1986 | Krubert | 426/87 |
| 4,586,888 | 5/1986 | Anderson | 425/362 |
| 5,297,947 | 3/1994 | Cardinali | 425/194 |
| 5,340,599 | 8/1994 | Maruyama et al. | 426/512 |
| 5,431,943 | 7/1995 | Sellmann | 426/512 |
| 5,462,757 | 10/1995 | Booy et al. | 426/512 |

*Primary Examiner*—George Yeung
*Attorney, Agent, or Firm*—Banner & Witcoff, Ltd.

[57] ABSTRACT

A thin, deformable film or web is placed tightly against the surface of a rotary die having molding cavities. Dough is applied onto the film against the surface of the rotary die. Pressure is applied to the dough, deforming the film and forcing the film and dough to conform to the shape of the molding cavities. The film thus forms a barrier between the molding cavities of the rotary die and the dough, but allows any design details of the molding cavities to be transferred to the dough. The molded dough is easily extracted from the die cavities by removing the film and molded dough from the rotary die, and the film is easily removed from the molded dough.

7 Claims, 2 Drawing Sheets

ROTARY FILM COOKIE MOLDING

The invention relates to an apparatus and method for rotary molding dough, particularly soft or sticky doughs that are difficult to extract from a rotary die. Such soft or sticky doughs include "no-fat" dough and biscuit dough.

BACKGROUND OF THE INVENTION

Rotary die molds are used by commercial bakeries to produce baked goods on a large scale. Typically dough is forced into cavities on a die roll to mold the dough into the desired shape and size. The molded dough is then removed from the cavities and further processed, for example, by baking.

Rotary die molding has been particularly beneficial for the production of hard cookies from stiff, dry and crumbly dough. This type of dough releases well from the die. On the other hand, soft or sticky doughs are difficult to mold using a rotary die mold. Soft or sticky doughs are used to make softer baked goods, often associated with "homemade" products, such as soft cookies; and are also used for biscuits, crackers and "no fat" products. Soft or sticky doughs are difficult to mold because they are more flowable and stickier than products made from the stiff, dry dough.

Since rotary molding is ideal for producing molded dough on a large scale, commercial bakeries have sought to use rotary molding for soft or sticky doughs as well. U.S. Pat. No. 4,586,888, for example, describes rotary molding for soft dough. However, rotary molding has proven difficult due to the sticky nature of the dough which hampers release from the mold.

There have been attempts to solve the stickiness problem. For instance, TEFLON® or other nonstick coatings have been applied to the surfaces of the rotary die cavities. However, these types of coatings eventually wear off or become pitted and must be reapplied or the die must be replaced. U.S. Pat. No. 5,297,947 describes plastic inserts which are inserted into each of the rotary die cavities. The inserts snap into place, but can be removed when damaged or worn. However, these inserts could deform or release during operation if not fitted properly. U.S. Pat. No. 5,340,990 discloses pretreatment processes such as prespraying water, steam, or hot water, spreading grain powder, or applying edible oil or fat to the forming surface before contacting the composition to be molded to provide a releasable surface. However, it is difficult to control the right amount of liquid or powder additive and the additive may alter the taste of the final product.

Liners, such as paper liners, are known for baked products such as pies, cakes and breads. U.S. Pat. No. 2,700,939 provides a typical arrangement whereby a paper liner carries a layer of dough to a mold and die arrangement on a conveyor belt. Eventually the liner is severed between adjoining molds, and the molded product and liner is removed from the mold. Other liners have been used to provide a layer between a molded product, such as butter, and a mold. U.S. Pat. No. 3,410,699 describes placing blanks of butter between two sheets of flexible film. The butter/film sheets are then placed between a mold and plunger. The plunger forces the butter into the die cavities of the mold. The molded butter and liners are then easily removed from the mold. The liners can serve as a package until the butter needed. These types of liner arrangements are not suitable for rotary molding apparatus.

There is a need for an effective rotary die molding process for soft or sticky dough having a simple and efficient means for releasing such dough from a rotary die mold. There is also a need for the production of molded soft or sticky dough which provide the unique aesthetic detail designs of rotary molder cavities otherwise unachievable with current molder technology.

SUMMARY OF THE INVENTION

The present invention is directed to a continuous process for molding dough using a rotary die. The process of the present invention is particularly useful for molding soft or sticky doughs that are difficult to extract from a rotary die. In accordance with the present invention, a thin, deformable film is placed tightly against the surface of a rotary die having molding cavities. Dough is applied onto the film against the rotary die. Pressure is applied to the dough, deforming the film and forcing the film and dough to conform to the shape of the molding cavities. The film thus forms a barrier between molding cavities of the rotary die and the dough, but allows design details of the molding cavities to be transferred to the dough. That is, the plastic film does not interfere with the imprinting of design details provided by rotary molding cavities on the dough. The dough is molded in the shape of the cavities. The film and molded dough are removed from the cavities and the film is then removed from the molded dough.

The present invention is also directed to an apparatus for producing molded dough. The apparatus has a rotary die with a surface containing a plurality of molding cavities and a thin, deformable film positioning device to provide a film adjacent the surface of the die. The apparatus also contains a dough release mechanism to position dough on the film adjacent the surface of the die and a pressure applying device to force the dough and film into the cavities to mold the dough in the shape of the cavities. Further, there is supplied a mechanism to remove the film and molded dough from the cavities and a mechanism to separate the molded dough from the film. Also included are devices to support and transfer the molded dough away from the rotary die.

The present invention reduces the amount of cleaning of the rotary molding apparatus since dough does not come in contact with the molding cavities. The film can be simply rewound and thrown away, recycled, or reused, if feasible.

In a preferred embodiment of the present invention, a conveyor belt, used to support and transfer the molded dough away from the rotary die, is operated independently of the rotary die to avoid slippage of the belt against the rotary die.

It is to be understood that both the foregoing general description and the following detailed description are exemplary and explanatory only and are not restrictive of the present invention as claimed.

DETAILED DESCRIPTION OF THE INVENTION

Figure 1:
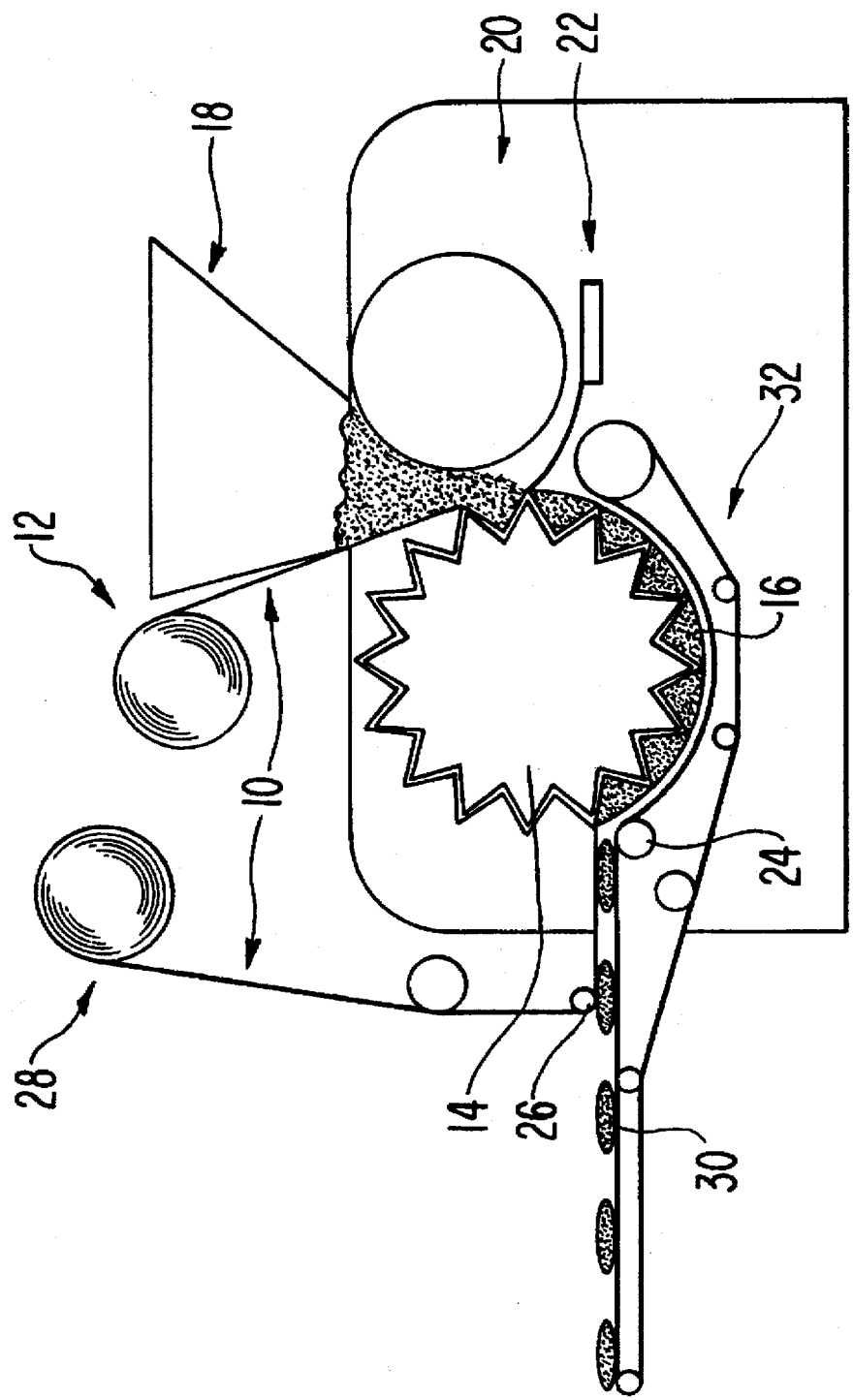
FIG. 1 illustrates a rotary molding apparatus in accordance with the present invention.

A rotary molding apparatus in accordance with the present invention is depicted in FIG. 1. A thin, deformable film (10) is released from a roll (12) and placed tightly against the surface of a rotary die (14). The rotary die contains a plurality of molding cavities (16). Dough is released from a dough hopper (18) and forced against the die by a compression roller (20). The pressure from the compression roller forces the dough into the molding cavities thereby deforming the film. The film forms a barrier between the molding cavities and the dough, but allows the dough to conform to the features of the die. Excess dough is then trimmed by molder knife (22).

The film and molded dough advances with the rotary die. The film is then removed from the rotary die through the action of take-up roll guides (24) and (26) and rewind roller (28). The rewind roller operates to take up any slack in the film as the film is pulled away from the rotary die. The action of removing the film also removes the molded dough (30) from the cavities. The molded dough is then sandwiched between the film and a conveyor belt (32). The film is pulled away from the dough by the take-up roll guide (26) leaving the dough on the conveyor belt. The conveyor belt then moves the dough to the next processing step.

The rotary die can be any rotary die such as those conventionally used in the art. The rotary die is typically in the form of a cylinder or drum so multiple cookies are formed at the same time which allows for commercial application. The cavities in the rotary die may be smooth or contain designs which emboss the dough.

The hopper is one example of dough feed means. Other means effective to supply dough to the rotary die are contemplated and within the skill of the art.

The film must be able to conform to the shape of the cavities of the rotary die without tearing. Any film effective to allow molding of the dough in the cavities of the rotary die and effective to release the dough after the dough is molded is contemplated by the present invention. Examples of such films are plastic films such as polyethylene or polyvinylchloride. Preferably, the film is polyethylene such as "stretch polyethylene film." Stretch films are made with a bi-actual process for even shrinkage in biaxial directions.

The film is thick enough so it will not tear but thin enough so that the features formed in the die are transferred to the dough. The ideal thickness of the film depends on the nature of the dough, the type of rotary die, etc. and is within the skill of the art. Preferably the thickness is about 0.5 to 1.25 mil thick.

The film is preferably released from a tension-controlled roll so that the film is placed tightly against the surface of the rotary die adjacent the cavities.

The conveyor belt is pressed against the rotary die so that the conveyor belt adheres to the base surface of the molded dough within the die cavities. The adhesion of the conveyor belt to the base surface of the dough aids in the removal of the dough from the rotary die and also allows the film to be easily removed from the doughs molded surface.

The conveyor belt may be of any conventional material for cookie dough processing. Typically the conveyor belt is a coarsely-woven cotton or canvas or a web material. The conveyor belt is also referred to in the art as an apron or an extraction web.

The dough may be baking dough, particularly soft dough such as cookie dough or biscuit dough. The dough can be removed from the die in discrete pieces or a continuous channel. The residence time of the dough in the rotary die and on the conveyor belt prior to and after film removal may be varied by adjusting the speed of the rotary die and conveyor belt and alternating positions of the take-up roll guides.

The locations of the rotary die roll, hopper, compression roller, conveyor belt and roll guides can be varied as desired to accommodate processing conditions and are within the skill of the art. For example, the hopper can be remote from the roller, with the dough introduced by a pipe.

The present invention is also directed to an apparatus for producing molded dough. The present invention can be used with any type of rotary molding apparatus and not just the specific type described herein.

The apparatus has a rotary die with a surface containing a plurality of molding cavities and a thin, deformable film positioning device to provide a film adjacent the surface of the die. The apparatus also contains a dough release mechanism to position dough on the film adjacent the surface of the die and pressure applying device to force the dough and film into the cavities to mold the dough in the shape of the cavities. Further, there is supplied a mechanism to remove the film and molded dough from the cavities and a mechanism to separate the molded dough from the film. Also included are devices to support and transfer the molded dough away from the rotary die.

The film positioning device can include a film unwinder roll, preferably a tension-controlled unwinder roll, although other device which position the film are contemplated.

Dough release mechanisms are well within the skill of the art and include feed rolls and dough hoppers whereby the dough is gravity fed through the hopper. A pressure applying device to force the dough and film into the cavities of the rotary die are also well within the skill of the art and typically is a compression roller.

A device to remove excess dough from the rotary die roll may be placed prior to or after the compression roller. Typically a molder or shear knife is used to remove excess dough.

A mechanism to remove the film and molded dough from the cavities and to pull the film away from the molded dough include film rewinder rollers and take-up roll guides such as depicted in FIG. 1. Other mechanisms which would accomplish removal of the film from the cavities and from the dough are within the scope of the present invention.

Devices to support and carry the dough after removal from the cavities are known in the art and are typically conveyor belts. The conveyor belt should advance at the same speed as the rotary die.

Figure 2:
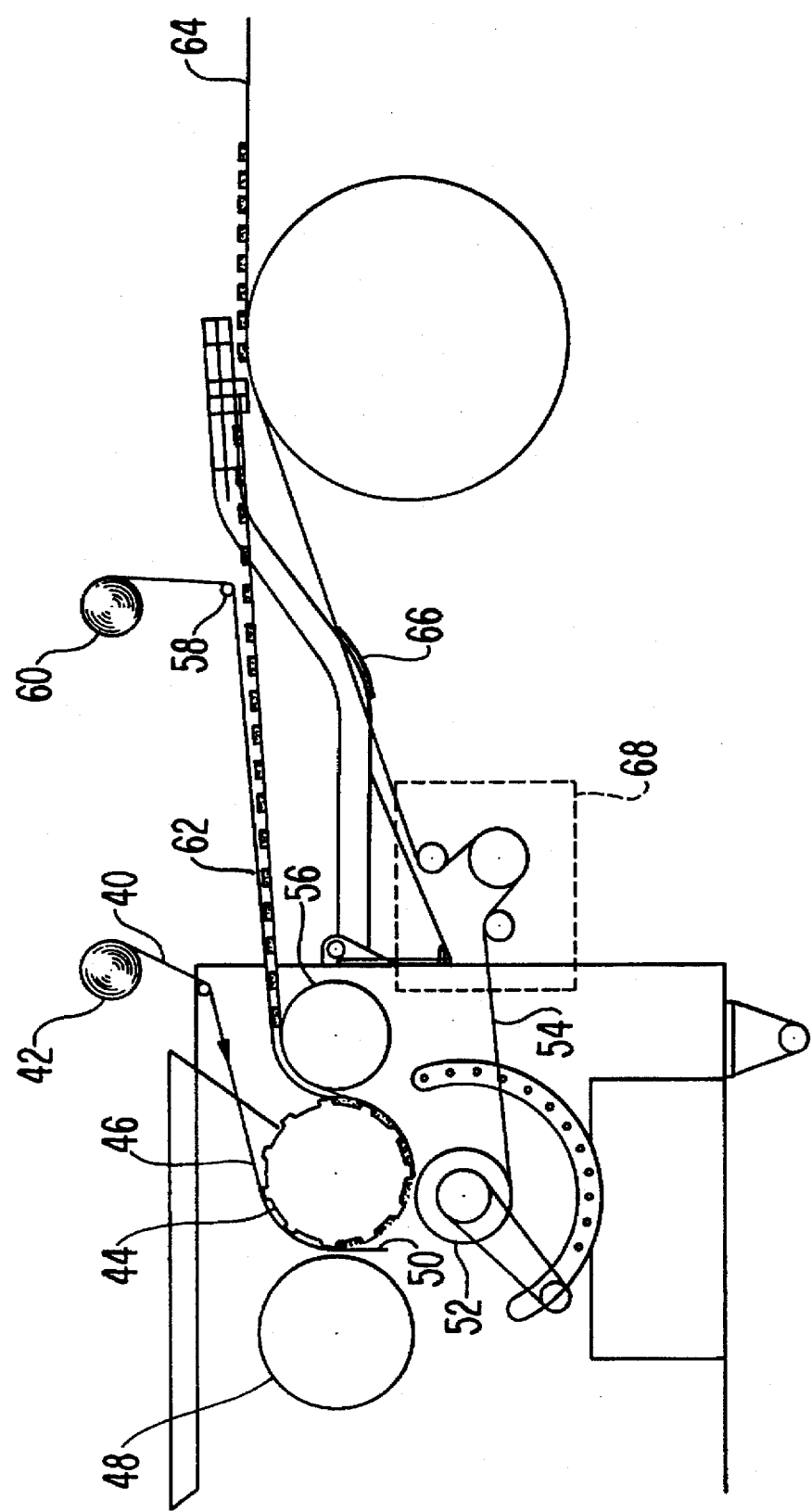
FIG. 2 illustrates a rotary molding apparatus having separate means to drive a conveyor belt in accordance with a preferred embodiment of the present invention.

A conveyor belt not operated in an independent manner, such as shown in FIG. 1, can slip against the rotary die. This slipping can deform the molded dough because the conveyor belt is not in synchronization with the rotary die. Thus, in a preferred embodiment of the claimed invention, the conveyor belt supporting the molded dough is operated independently of the rotary device. This independent operation prevents the conveyor belt from slipping against the rotary die. FIG. 2 illustrates a preferred embodiment of the present invention using a conveyor belt operated independently of the rotary die.

A thin, deformable film (40) is released from a roll (42) and placed tightly against the surface of a rotary die (44) containing a plurality of molding cavities (46). Dough is fed onto the film against the surface of the rotary die using feed roller (48) which feed roller also forces the dough into the molding cavities thereby deforming the film. Excess dough is trimmed by molder knife (50). A compression roller (52) positions a conveyor belt (54) against the exposed surface of the molded dough.

The plastic film, molded dough, and conveyor belt advances with the rotary die and then the plastic film is removed by action of take-up roll guides (56) and (58) and rewind roller (60). The action of removing the film removes the dough (62) from the cavities. Roller (56) also guides the conveyor belt away from the rotary die so that the molded dough is sandwiched between the film and the conveyor belt. The film is directed away from the molded surface of the dough by the take-up roll guide (58) leaving the dough on the conveyor belt. The conveyor belt then transfers the dough to another conveyor belt (64) which in turn carries the dough to the next processing step. After transferring the dough, the conveyor belt (54) is scraped with knife (66) to remove any residual dough.

The conveyor belt is operated independently of the rotary die. Box (68) depicts a separate drive system for the conveyor belt. This system is made up of a set of compression wrapping rollers which rely on a servomechanism to keep the conveyor belt in synchronization with the rotary die and film thereby preventing slippage and deformation of the dough pieces. The placement and operation of the separate drive system is within the skill of the art.

The conveyor belt, operated independently of the rotary die, may also be used in rotary die methods and apparatus that do not require a thin deformable film. That is, the adhesion of the conveyor belt to the base surface of the molded dough is sufficient to extract the dough from the cavities of the rotary die without deforming the dough. Such doughs include dry doughs used to make hard cookies.

It will be apparent to those skilled in the art that various modifications and variations can be made in the methods and apparatus of the present invention without departing from the spirit or scope of the invention. Thus, it is intended that the present invention cover the modifications and variations of this invention provided they come within the scope of the appended claims and their equivalents.

I claim:

1. A method for rotary molding dough comprising:

placing a thin, deformable film tightly against the surface of a rotary die having molding cavities;

applying dough onto said film against said rotary die;

applying pressure to said dough, forcing said dough to deform said film and forcing said film and said dough to conform to the shape of said cavities, whereby said film forms a barrier between said molding cavities and said dough and whereby said dough is molded in the shape of said cavities;

removing said film and molded dough from said cavities; and removing said film from said molded dough.

2. The method of claim 1 wherein said thin, deformable film is plastic.

3. The method of claim 2 wherein said thin, deformable film is polyethylene.

4. The method of claim 1 wherein said thin, deformable film is released against said rotary die from a tension-controlled roll.

5. The method of claim 1 further comprising taking up said film on a rewind roller after said molded dough is released.

6. The method of claim 1 further comprising removing said dough from said molding cavities onto a conveyor belt.

7. The method of claim 6 wherein said conveyor belt operates independently of the rotary die.

* * * * *